Sept. 16, 1941.  L. LEITZ ET AL  2,256,208
COMBINED CAMERA AND EXPOSURE METER
Filed Dec. 12, 1940
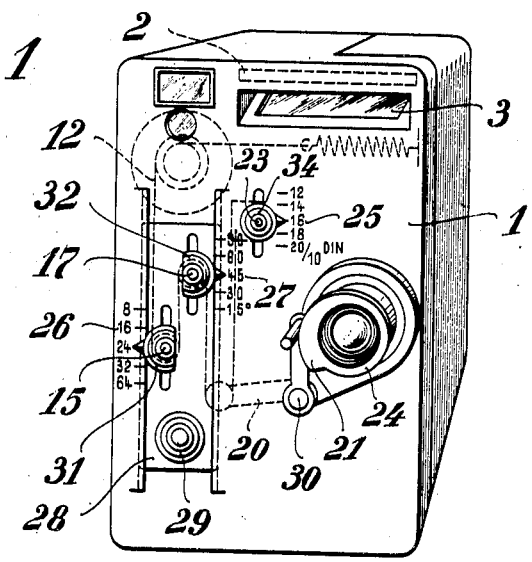
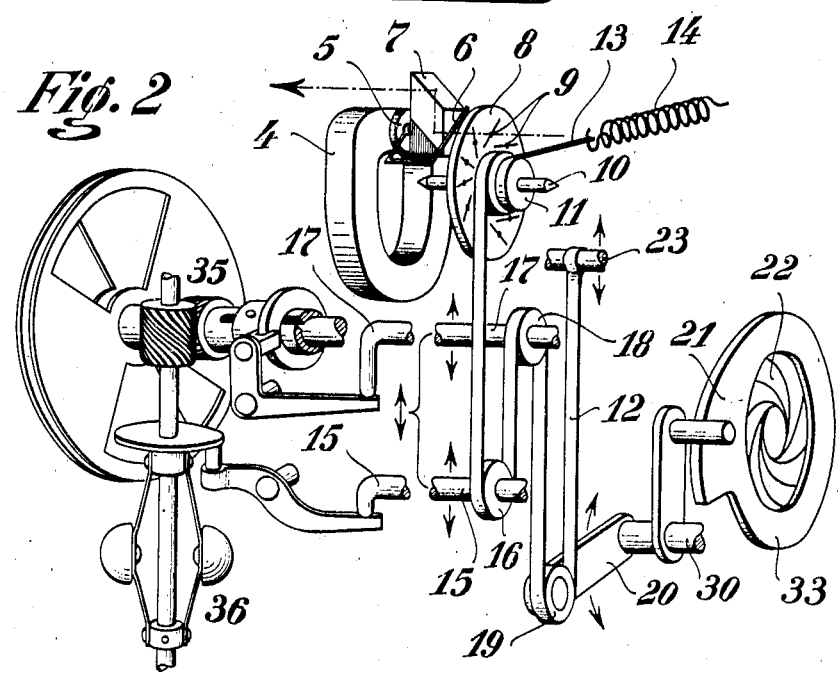
INVENTORS
Ludwig Leitz & Heinrich Broschke
BY
Ivan E. A. Konigsberg
ATTORNEY Patented Sept. 16, 1941

2,256,208

UNITED STATES PATENT OFFICE 2,256,208

COMBINED CAMERA AND EXPOSURE METER

Ludwig Leitz and Heinrich Broschke, Wetzlar, Germany

Application December 12, 1940, Serial No. 369,796
In Germany January 5, 1940

9 Claims. (Cl. 95—10)

This invention relates to improvements in the mechanisms used in photographic apparatus combined with exposure meters for selectively distributing the exposure value indicated by the meter upon the exposure controlling elements of a photographic camera. In some cameras these elements may be spaced some distance apart and such a distributing mechanism is apt to become rather complicated. In a motion picture camera the mechanism becomes very complicated because the time adjustment of the shutter must be divided between the picture frequency regulator and the shutter sector regulator. If adjustment with respect to the film sensitivity is also included there are altogether four factors to be considered in order to obtain correct exposure adjustment.

The object of this invention is to provide an improved mechanism for coupling or connecting the exposure controlling elements of a camera, particularly a motion picture camera, with the exposure indicating means of a photoelectric exposure meter whereby the adjustment of these elements to accord with the indicated exposure value may be done in a very simple manner. The invention is illustrated in the accompanying drawing in which Fig. 1 is a perspective view of a motion picture camera equipped with a coupling or connecting mechanism according to the invention. Fig. 2 is a diagrammatic perspective view of the mechanism and associated parts.

In the drawing the camera 1 is provided with an exposure meter comprising a photoelectric cell 2 which receives reflected light from a mirror 3. The cell actuates a galvanometer including a magnet 4, a rotor 5 and a pointer 6. A transparent disk 8 is mounted on a rotatable shaft 10. The disk carries exposure indicating marks 9 and these latter and the pointer are observed in an ocular (not shown) through a prism 7. The camera has an objective 24, a shutter 35 and a picture frequency regulator 36. These elements may be of any usual type and are indicated only in outline. Their general operation and function are well known in the art. The objective has a diaphragm 22 adjustable as usual by a rotatable ring 33 which has a cam 21. The latter is engaged by a bell crank 20 which in turn carries a pulley 19. As the diaphragm is adjusted by rotating the cam ring, the pulley 19 moves up or down. The picture frequency regulator may be adjusted by moving a shaft 15 up or down, the operation being obvious from the drawing. The shaft is moved by a knob 31 on the front of the camera. The shutter sector is varied by moving another shaft 17 up or down by means of a knob 32. A fourth adjustment may be made with respect to the sensitivity of the film by moving a pin 23 up or down by means of a knob 34.

The disk shaft 10 carries a pulley 11 to which a band 13 is attached under tension by a spring 14. The band therefore tends to rotate the disk and pulley clockwise in Fig. 2. To the pulley 11 is also secured a transmission belt 12 which passes around the pulleys 16 and 18 on the shafts 15 and 17, and also the pulley 19. The end of the belt is secured to the pin 23. The belt passes around the several pulleys 180 degrees. If the belt is slackened the disk 8 moves clockwise. If the belt is lengthened it unwinds from the pulley 11 and rotates the disk 8 anticlockwise. The knobs 31, 32 and 34 engage slots in the front plate of the camera and are held there by friction or other means, not shown. The slots for the knobs 31 and 32 are located in a common plate 29 slidable in guides as shown by means of a knob 29. The front of the camera carries a film sensitivity scale 25, a shutter opening scale 27 and a picture frequency scale 26.

The operation is as follows: When the camera is loaded with film the sensitivity adjuster 23 is moved to the proper position indicated on the sensitivity scale 25 and the belt 12 will be correspondingly either shortened or lengthened. Thereafter the photographer may decide upon a certain diaphragm opening, for instance, and rotate the cam ring 33 to effect such opening. Consequently, the pulley 19, indicating such adjustment of the diaphragm, will be raised or lowered accordingly and the belt varied in its length with respect to the pulley 11. Likewise the photographer may decide to operate with a certain picture frequency and the frequency indicator 16 is adjusted accordingly opposite a selected index on the scale 26. The camera is then aimed at the object and the pointer 6 will deflect and assume an exposure indicating position. It will then be found that because of the lengthwise movements of the belt 12 resulting from the adjusting operations of the elements 23, 19 and 15 as aforesaid, the disk 8 will have been rotated until either one of the marks 9 registers with the pointer 6 or none of the marks 9 registers with the pointer. In the first case no further adjustment is necessary. In the second case the shutter adjustment indicator 17 will be moved up or down so as to move the belt 12 lengthwise to cause rotation of the disk 8 until that mark 9 which is nearest the pointer is brought into register therewith. The camera is now adjusted for an exposure which is indicated by the position of the pointer 6.

The correct adjustment of the exposure controlling elements may of course also be done by selecting a picture frequency and a shutter opening and thereafter adjust the diaphragm to cause the final rotation or movement of the disk 8. Or a shutter opening and a diaphragm opening may be predetermined and the frequency regulator moved to cause the final rotation of the disk 8. The feature of the invention is that by operatively interconnecting the four factor elements 23, 22, 16 and 17 with the exposure indicator disk 8 by means of a single operative element, namely the belt 12, exposure adjustment is effected by the simple expedient of moving the belt lengthwise in either direction in accordance with the adjustment of any one or all of the factor elements. In addition, by moving the plate 28 up or down, the frequency indicator and the shutter sector indicator may be adjusted together without changing the exposure time and without changing their mutual adjustment.

We claim:

1. In a combined photographic camera and exposure meter, said camera having a film sensitivity adjuster, a diaphragm and diaphragm adjuster, a shutter and shutter adjuster and means for holding said adjusters in their adjusted positions; said meter having a photoelectrically actuated exposure indicating pointer; a rotatable disk and pulley mounted in optically operative relation to said pointer, said disk having exposure indicating marks adapted to be moved into registry with said pointer by rotation of said disk and pulley, a transmission belt having one end connected to said sensitivity adjuster and the other end connected to said pulley, the free run of said belt operatively engaging said other adjusters, spring actuated means for rotating said disk and pulley in one direction and means for moving said adjusters to vary the free run of said belt in accordance with such movements to cause rotation of the disk and pulley in the same or opposite direction whereby to move one of said disk marks into register with said pointer to indicate correct exposure adjustment of said diaphragm and shutter.

2. In a combined photographic camera and exposure meter, said camera having a film sensitivity adjuster, a diaphragm and diaphragm adjuster, a shutter and shutter adjuster and means for holding said adjusters in their adjusted positions; said meter having a photoelectrically actuated pointer for indicating exposure; a rotatable disk and pulley mounted in optically operative relation to said pointer, said disk having exposure indicating marks adapted to be moved into registry with said pointer by rotation of said disk and pulley, a single flexible member having one end connected to one of said adjusters and the other end connected to said pulley with the intermediate portion of said flexible member in operative engagement with all the other adjusters, spring actuated means connected to said pulley constantly tending to rotate the same and said disk in one direction and means for individually moving said adjusters to actuate said flexible member in accordance with such movements to cause rotation of said disk and pulley in the same or opposite direction whereby to move one of said disk marks into registry with said pointer to indicate correct exposure adjustment of said diaphragm and shutter.

3. In a photographic apparatus according to claim 2 in which said camera is a motion picture camera having also a picture frequency regulator and adjuster therefor, the said intermediate portion of said flexible member also engaging said frequency adjuster, said registry position of said disk mark with said pointer also indicating correct exposure adjustment of said picture frequency regulator.

4. In a combined motion picture camera and exposure meter, said camera having a film sensitivity adjuster, a diaphragm and diaphragm adjuster, a shutter and shutter adjuster, a picture frequency regulator and adjuster therefor and means for holding said adjusters in their adjusted positions; said meter having a photoelectrically actuated exposure indicating pointer; a rotatable disk and pulley mounted in optically operative relation to said pointer, said disk having exposure indicating marks adapted to be moved into registry with said pointer by rotation of said disk and pulley, a transmission belt having one end connected to said sensitivity adjuster and the other end connected to said pulley, the free run of said belt operatively engaging said other adjusters, spring actuated means for rotating said disk and pulley in one direction and means for moving said adjusters to change the free run of said belt in accordance with such movements to cause rotation of said disk and pulley in the same or opposite direction whereby to move one of said disk marks into registry with said pointer to indicate correct exposure adjustment of said adjusters, means for simultaneously additionally adjusting the shutter adjuster and the frequency adjuster while maintaining the registry position of said mark and pointer.

5. In a combined motion picture camera and exposure meter, the latter having a photoelectrically actuated exposure indicating pointer, said camera having a film sensitivity adjuster, a shutter and shutter adjuster, a picture frequency regulator and adjuster therefor, scales on said camera indicating the positions of said adjusters, means for holding said adjusters in their adjusted positions, and a variable diaphragm and a cam ring for adjusting the same; a rotatable disk and pulley mounted in optically operative relation to said pointer, said disk having exposure indicating marks adapted to be moved into registry with said pointer by rotation of said disk and pulley, a transmission belt having its one end connected to said sensitivity adjuster and its other end connected to said pulley, the free run of said belt operatively engaging all of said adjusters along said belt, spring actuated means connected to said pulley and constantly urging rotation thereof in one direction, means for moving said adjusters selectively from said positions to other selected positions to lengthwise change the free run of said belt in accordance with such movements to cause rotation of said disk and pulley in the same or opposite direction, a member operatively engaging said belt and said diaphragm cam ring to lengthwise change the free run of said belt in accordance with the adjustment of the diaphragm to cause additional rotation of said disk and pulley in the same or opposite direction as aforesaid, said changes in the free run of said belt resulting in moving one of said disk marks into registry with said pointer whereby to indicate correct exposure adjustment of the exposure controlling elements of said camera.

6. In a camera and exposure meter mechanism according to claim 5 including means for simultaneously additionally adjusting said shutter and said frequency adjusters while maintaining the registry position of said mark and pointer.

7. In a photographic apparatus having a plurality of exposure controlling elements, means for determining the correct exposure position of said elements comprising in combination a light sensitive cell with a pointer actuated thereby, a rotatable member having exposure indicating marks in optically operative relation to said pointer, said marks being adapted to be moved into registry with said pointer when the latter has been deflected by exposure of said cell, a manually operable adjustment for each of said elements and a single connecting member between all of said adjustments and said disk whereby the latter may be rotated stepwise by operation of said adjustments to bring one of said marks into registry with said pointer by such adjustments of said exposure controlling elements as will give correct exposure by apportioning the full light value indicated by the deflection of the pointer in selected proportions between said exposure controlling elements.

8. In a combined photographic camera and exposure meter, the latter having a photoelectrically actuated exposure indicating pointer, said camera having a plurality of exposure controlling elements; mechanism for selectively distributing said indicated exposure value upon said elements, said mechanism comprising a rotatable disk mounted in optically operative relation to said pointer, said disk having exposure indicating marks adapted to be moved into registry with said pointer by rotation of said disk, a transmission belt constantly operatively connected to said disk and to all of said exposure controlling elements and means for independently and selectively adjusting any one of said elements to actuate said belt to cause rotation of said disk to an extent directly proportional to the adjustment of said element.

9. In a combined photographic camera and exposure meter according to claim 8 including means for adjusting all of said exposure controlling elements to actuate said belt to cause rotation of said disk to move one of said marks into registry with said pointer to indicate correct exposure adjustments of said elements and means for thereafter simultaneously adjusting some of said elements with relation to said belt while maintaining the registry position of said mark and pointer.

LUDWIG LEITZ.
HEINRICH BROSCHKE.